(12) United States Patent
Yazdani

(10) Patent No.: US 9,091,310 B2
(45) Date of Patent: Jul. 28, 2015

(54) ANTI-BACKLASH COUPLER

(75) Inventor: Saeed Yazdani, Moorpark, CA (US)

(73) Assignee: Kavlico Corporation, Moorpark, CA (US)

(*) Notice: Subject to any disclaimer, the term of this patent is extended or adjusted under 35 U.S.C. 154(b) by 232 days.

(21) Appl. No.: 13/408,761

(22) Filed: Feb. 29, 2012

(65) Prior Publication Data

US 2013/0221954 A1 Aug. 29, 2013

(51) Int. Cl.
| F16D 1/00 | (2006.01) |
| G01B 7/30 | (2006.01) |
| G01B 5/24 | (2006.01) |
| F16D 47/02 | (2006.01) |
| F16D 1/104 | (2006.01) |

(52) U.S. Cl.
CPC .............. *F16D 47/02* (2013.01); *F16D 1/104* (2013.01); *F16D 2300/18* (2013.01); *Y10T 403/7039* (2015.01)

(58) Field of Classification Search
CPC .................................. F16D 47/02; F16D 1/104
See application file for complete search history.

(56) References Cited

U.S. PATENT DOCUMENTS

| 2,004,077 | A | * | 6/1935 | McCartney et al. ............ 464/76 |
| 3,010,296 | A | * | 11/1961 | Tetlow ............................ 464/72 |
| 3,034,323 | A | * | 5/1962 | Edstrom ....................... 464/105 |
| 3,286,489 | A | * | 11/1966 | Turro ............................ 464/101 |
| 4,460,345 | A | * | 7/1984 | Chivari ........................... 464/69 |
| 4,527,986 | A | * | 7/1985 | Bridgewater et al. ........... 464/73 |
| 5,272,927 | A | * | 12/1993 | Carlen ......................... 73/866.1 |
| 5,438,172 | A | * | 8/1995 | Fowler et al. ............... 200/11 R |
| 5,928,083 | A |   | 7/1999 | Monahan et al. |
| 2008/0153606 | A1 |   | 6/2008 | Koop et al. |

FOREIGN PATENT DOCUMENTS

| DE | 85 29 380 U1 | 12/1985 |
| EP | 0 644 402 A1 | 3/1995 |
| WO | 2013112181 A1 | 8/2013 |

OTHER PUBLICATIONS

English Machine Translation of DE8529380.*
International Search Report and Written Opinion; PCT/US2013/026574; European Patent Office as International Searching Authority; dated May 10, 2013.
International Preliminary Report on Patentability for International Application No. PCT/US2013/026574, dated Sep. 12, 2014, 7 pgs.

* cited by examiner

*Primary Examiner* — Jermele M Hollington
(74) *Attorney, Agent, or Firm* — Hunter Clark PLLC

(57) ABSTRACT

Disclosed are devices, systems, assemblies, couplers, and other implementations, including a coupler that includes a first coupling element matingly engaged to a second coupling element, each of the first and second coupling elements including a plate defining an opening, a projection extending from a first surface of the plate, and a socket extending from a second surface of the plate and configured to receive a rotatable member. The projection of the first coupling element is received in the opening of the plate of the second coupling element, and the projection of the second coupling element is received in the opening of the plate of the first coupling element. The matingly engaged coupling elements are configured to rotate in response to rotation of a first rotatable member of a first device received in the socket of the first coupling element.

12 Claims, 5 Drawing Sheets

ANTI-BACKLASH COUPLER

BACKGROUND

Rotary Sensors (e.g., sensors implemented using rotary variable differential transformers, or RVDT, potentiometer-based sensors, etc.) are generally used when accurate determination of the angular position of a structure is required. For example, it is important to determine, and if necessary to correct, the angular position and/or orientation of the wheels of a landing gear of an aircraft (e.g., if, during landing, the wheels are turned at an angle relative to the longitudinal axis of the fuselage, the wheels may break).

To enable accurate measurement of the angular position of the structure in question, in some situations multiple rotary sensors may be employed. In such situations, it is important to ensure that connecting multiple sensors to the structure whose angular position is to be determined (e.g., by connecting sensors in, for example, a series arrangement) does not result in in misalignment between the sensors, or in backlash, which could affect the accuracy of the measurements.

SUMMARY

Disclosed are assemblies, systems, devices and methods to determine angular position of a structure (e.g., angular position of the nose wheel of an aircraft) that include, for example, a coupler including a first coupling element matingly engaged to a second coupling element, with each of the first and second coupling elements comprising a plate defining an opening, a projection extending from a first surface of the plate, and a socket extending from a second surface of the plate configured to receive a rotatable member (e.g., a rotatable shaft). The projection of the first coupling element is received in the opening of the plate of the second coupling element, and the projection of the second coupling element is received in the opening of the plate of the first coupling element. The matingly engaged coupling elements are configured to rotate in response to rotation of rotatable member of a first device (e.g., a rotary sensor) received in the socket of the first coupling element.

Implementations provided herein are configured to enable multiple channels of tandem rotary sensors (such as potentiometers, RVDT and resolvers) to be coupled to one another. Such a coupling may be performed blindly (i.e., it is unnecessary, when using the couplers and assemblies such as those described in this disclosures, to carefully align the sensors with respect to each other). The couplers described herein may achieve, for example: 1) preventing side loading of RVDT shafts in case of a linear misalignment or an angular misalignment, 2) transferring the angular position from one sensor to another with minimum backlash. The implementations provided herein enable avoiding backlash when transferring rotary motion from one channel to another. In some embodiments, the implementations provided herein are configured to overcome angular and axial misalignment. The implementations provided herein also avoid angular shift (i.e., tracking between channels) due to temperature variation.

The implementations described herein include multiple rotary sensors (e.g., RVDT, Resolver, etc.) connected in a tandem arrangement (e.g., a series connection arrangement) to enable multi load path. Thus, in the event of failure of one sensor, other coupled sensors can take over. The coupler implementations described herein may be constructed from solid bar stock, and may be welded or otherwise attached to the end of the shaft of a rotary sensor to thus enable tandem attachment of multiple channels of sensors. In some embodiments, the couplers described herein may be used, for example, in an aerospace environment where tracking between channels is important (i.e., so as to obtain multiple independent measures to determine and/or improve the accuracy of the measurements).

Thus, in some embodiments, a coupler is disclosed. The coupler includes a first coupling element matingly engaged to a second coupling element, each of the first and second coupling elements including a plate defining an opening, a projection extending from a first surface of the plate, and a socket extending from a second surface of the plate and configured to receive a rotatable member. The projection of the first coupling element is received in the opening of the plate of the second coupling element, and the projection of the second coupling element is received in the opening of the plate of the first coupling element. The matingly engaged coupling elements are configured to rotate in response to rotation of a first rotatable member of a first device received in the socket of the first coupling element.

Embodiments of the coupler may include at least some of the features described in the present disclosure, including one or more of the following features.

The plate of each of the first coupling element and the second coupling element may include a disc section, and a leaf spring extending from the disc section such that the leaf spring and the disc section define the opening.

The leaf spring may integrally extend from the disc section.

The leaf spring of the first coupling element may extend in a first direction substantially opposite a second direction at which the leaf spring of the second coupling element extends.

The projection extending from the plate of each of the first coupling element and the second coupling element may include a pin.

The socket of each of the first coupling element and the second coupling element may include a hollow tube with an open end, the hollow tube extending from the second surface of the plate may be configured to receive the rotatable member through the open end of the hollow tube.

The first rotatable member of the first device may be a shaft of a rotatory sensor. The rotary sensor may include one of, for example, a rotary variable differential transformer (RVDT) sensor, a resolver sensor, and/or a potentiometer-based sensor.

The coupler may be configured to enable serial connection of multiple rotary sensors without causing backlash from the serial connection of the multiple sensors.

In some embodiments, an assembly is disclosed. The assembly includes a coupler comprising a first coupling element matingly engaged to a second coupling element, each of the first and second coupling elements including a plate defining an opening, a projection extending from a first surface of the plate, and a socket extending from a second surface of the plate and configured to receive a rotatable member. The assembly further includes a first device comprising a first rotatable shaft received in the socket of the first coupling element, and a second device comprising a second rotatable shaft received in the socket of the second coupling element. Rotation of the first shaft of the first device will cause rotation of the coupler and of the second shaft of the second device received in the socket of the second coupling element of the couplers.

Embodiments of the assembly may include at least some of features described in the present disclosure, including at least some of the features described above in relation to the coupler, as well as one or more of the following features.

The first shaft of the first device may be a shaft of a first rotary sensor, and the second shaft of the second device may be a shaft of a second rotary sensor.

One or more of the first rotary sensor and the second rotary sensor may include one or more of, for example, a rotary variable differential transformer (RVDT) sensor, a resolver sensor, and/or a potentiometer-based sensor.

In some embodiments, an assembly is disclosed. The assembly includes two or more couplers each comprising a first coupling element matingly engaged to a second coupling element, each of the first and second coupling elements including a plate defining an opening, a projection extending from a first surface of the plate, and a socket extending from a second surface of the plate and configured to receive a rotatable member. The assembly also includes a first device comprising a first rotatable shaft received in the socket of the first coupling element of one of the two or more couplers, a second device comprising a second rotatable shaft, the second rotatable shaft including a first end received in the socket of the second coupling element of the one of the two or more couplers and a second end received in the socket of the first coupling element of another of the two or more couplers. The assembly further includes an additional device including an additional rotatable shaft received in the socket of the second coupling element of the other of the two or more couplers. Rotation of the first shaft of the first device will cause rotation of the two or more couplers, the second shaft of the second device, and the additional shaft of the additional device.

Embodiments of the assembly may include at least some of features described in the present disclosure, including at least some of the features described above in relation to the coupler and the first assembly, as well as one or more of the following features.

The first shaft of the first device may be a shaft of a first rotary sensor, the second shaft of the second device may be a shaft of a second rotary sensor, and the additional shaft of the additional device may be a shaft of a third rotary sensor.

One or more of the first rotary sensor, the second rotary sensor, and the third rotary sensor may include one or more of, for example, a rotary variable differential transformer (RVDT) sensor, a resolver sensor, and/or a potentiometer-based sensor.

As used herein, the term "about" refers to a +/−10% variation from the nominal value. It is to be understood that such a variation is always included in a given value provided herein, whether or not it is specifically referred to.

As used herein, including in the claims, "and" or "or" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Unless defined otherwise, all technical and scientific terms used herein have the same meaning as commonly understood by one of ordinary skill in the art to which this invention belongs.

Details of one or more implementations are set forth in the accompanying drawings and in the description below. Further features, aspects, and advantages will become apparent from the description, the drawings, and the claims.

BRIEF DESCRIPTION OF THE FIGURES

Like reference symbols in the various drawings indicate like elements.

DETAILED DESCRIPTION

Disclosed herein are assemblies, systems, devices and methods, including a coupler that includes a first coupling element matingly engaged to a second coupling element, each of the first and second coupling elements comprising a plate defining an opening, a projection extending from a first surface of the plate, and a socket extending from a second surface of the plate and configured to receive a rotatable member. The projection of the first coupling element is received in the opening of the plate of the second coupling element, and the projection of the second coupling element is received in the opening of the plate of the first coupling element. The matingly engaged coupling elements are configured to rotate in response to rotation of a first rotatable member shaft of a first device received in the socket of the first coupling element.

Figure 1A:
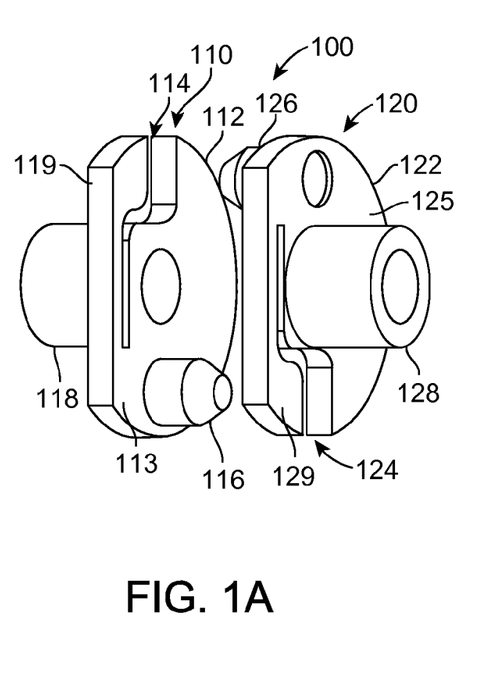
FIGS. 1A-B are perspective diagrams of an example embodiment of a coupler in a disengaged (FIG. 1A) and engaged (FIG. 1B) states.
Figure 1B:
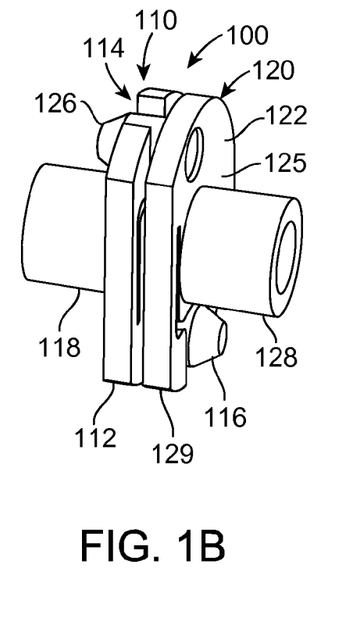
Figure 1C:
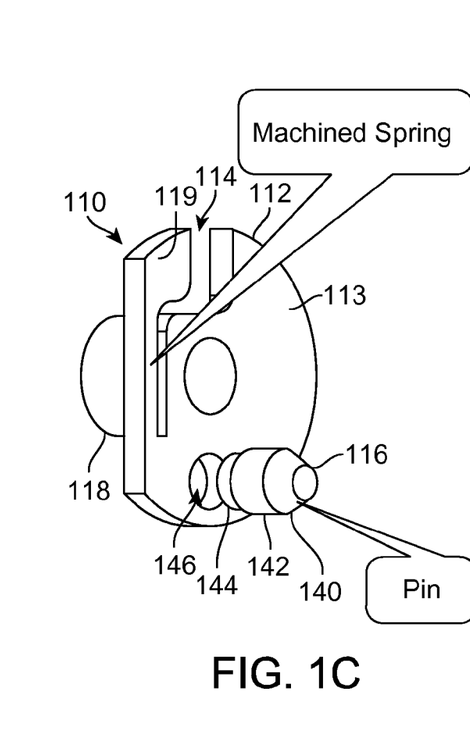
FIG. 1C is a perspective diagram of one coupling element of the coupler of FIGS. 1A and 1B.

FIGS. 1A-B are perspective diagrams of an example embodiment of a coupler 100 in a disengaged (FIG. 1A) and engaged (FIG. 1B) states. FIG. 1C is a diagram of one coupling element 110 of the coupler 100 shown in FIGS. 1A and 1B. The coupler 100 is configured to couple at least two rotatable members (e.g., shafts) of separate and independent rotary sensors (e.g., a rotary variable differential transformer) such that rotational actuation by an external rotatable structure will cause the same angular rotation by the at least two rotary sensors, and thus enables independent angular measurements of the extent of rotation undergone by the external rotatable structure. In some embodiments, the coupler 100 may also be used to couple other types of rotatable devices. The coupler 100 includes a first coupling element 110 configured to be matingly engaged to a second coupling element 120. In some embodiment, the second coupling element 120 may be similar in its configuration to the first coupling element 110, except that the coupling element 120 may be aligned as a mirror opposite of the coupling element 110 and rotated at approximately 180° relative to the coupling element 110. In some embodiments, the coupling elements 110 and 120 need not be mirror opposites of each other, and may have different configurations structured so as to enable the separate coupling elements to matingly engage each other such that the separate coupling elements undergo the same rotation in response to rotation of a rotatable structure that is physically coupled to one of the engaged coupling elements.

As further shown in FIGS. 1A and 1C, in some embodiments, the coupling element 110 includes a plate 112 defining an opening 114, a projection 116 extending from a first surface 113 of the plate 112, and a socket 118 extending from a second surface of the plate (the second surface is hidden from view in the perspective diagrams of FIGS. 1A and 1C) and configured to receive a rotatable member of one of the rotary sensors that is to be coupled by the coupler 100. Likewise, the second coupling element (shown in FIGS. 1A-B) may include a plate 122 defining an opening 124, a projection 126 extending from a first surface of the plate 122 of the second coupling element (the first surface of the plate of the second coupling element is hidden from view in the perspective diagrams of FIGS. 1A and 1B), and a socket 128 extending from a second surface 125 of the plate 122 of the second coupling element 120.

When the two coupling elements constituting the coupler 100 are matingly engaged, the projection 116 of the first coupling element 110 is received in the opening 124 of the plate 122 of the second coupling element 120, and the projection 126 of the second coupling element 120 is received in the opening 114 of the plate 112 of the first coupling element 110. The matingly engaged coupling elements are configured to rotate in response to rotation of a rotatable member (such as a rotatable shaft) of a rotatable device, such as a rotary sensor, when the rotatable member is received in the socket of the first coupling element. The assembled coupler 100 (i.e., when its two coupling elements are matingly engaged, as more particularly shown in FIG. 1B) is generally held (or suspended/supported) by the rotatable members received in the coupler's sockets, and generally does not otherwise need to be supported by some supporting structure. Thus, rotation of the rotatable member received in the socket of the first coupling element (e.g., the socket 118) will cause rotation of the first coupling element through the same angular displacement as that undergone by the rotatable member. Because the second coupling element is matingly engaged to the first coupling element, the second coupling element will also be rotated through the same angular displacement as that of the first coupling element and as that of the rotatable member, thus causing a second rotatable member received in the socket of the second coupling element (e.g., the socket 128) to also rotate through the same angular displacement. Accordingly, because the two rotatable members (e.g., of two rotary sensors) coupled to the coupler 100 undergo the same rotational angular displacement, the rotary sensors whose rotatable members are coupled to the coupler 100 will be able to measure substantially the same angular displacement and provide separate and independent angular displacements/position measurements.

With continued reference to FIGS. 1A-C, in some implementations, each of the plates 112 and 122 of the first coupling element 110 and the second coupling element 120 may include a disc section (e.g., a structure resembling a round disc broken around its middle) and a leaf spring 119 and 129 extending from the respective disc sections such that the leaf springs 119 and 129 and the respective disc sections define the openings 114 and 124. The disc sections and respective leaf springs may be integrally connected to each other. For example, the plates 112 and 122 may each be machine carved from a single piece of material such as, for example, a bar stock 17-7PH or 15-5PH material. Each leaf spring may be structured to be resiliently biased inwardly such that when a projection of one coupling element (such as the projection 126) with a diameter larger than that of an opening defined by the leaf spring and disc section of its counterpart coupling element through which the projection is to be received, the leaf spring can be pushed outwardly to enable passage of the projection being received. Once received, the resiliently structured leaf spring that was pushed outwardly will apply an inward force to keep the received projection from the second coupling element in place. In some embodiments, the leaf spring 119 of the first coupling element 110 extends in a first direction substantially opposite a second direction at which the leaf spring 129 of the second coupling element 120 extends.

In some variations, each of the projections 116 and 126 extending from the plates 112 and 122 of the first coupling element 110 and the second coupling element 120 may include a pin. As shown in FIG. 1C, the pin corresponding to the projection 116 may include a cone section 140, a middle section 142, and a base 144. In some implementations, the pin is constructed separately from the plate, and is secured to the plate by fitting its base 144 into a bore (or hole) 146 defined in the plate. The diameter of the bore 146 may be slightly smaller than the diameter of the base 144 of the pin so that the base 144 is press fitted into the bore 146. For example, in some embodiments, the diameter of the base 144 of the pin may be larger than the diameter of the bore 146 by about 0.005" to 0.010", depending on the configuration and size of the disc. Press fitting the base of the pin into the bore may achieve a zero backlash performance. In some implementations, the base of the pin may be welded, glued, threaded, or otherwise fastened to the plate, and may be so fastened instead of or in addition to fitting the base of the pin into the bore 146. In some implementations, the pin corresponding to the projection 116 may be an integral part of the plate, e.g., where a single solid piece is cut (for example, machine mill cut, EDM cut, water jet cut, etc.), or where the coupling structure is manufactured using a mould, to form an integral one-piece pin-disc-socket structure.

Similarly, and as shown in FIGS. 1A and 1B, the counterpart plate 120 that is to be matingly engaged to the first plate 110 may also have a pin of similar construction and configuration as the pin to be secured to the plate 110. The cone section 140 of the pin of the first plate 110 is configured to be received through the opening 124 defined in the second, opposite, plate 120 with which the first plate 110 is to be matingly engaged, with the cone section 140 passing through the opening 124 up to the point where the tapered walls of the cone section 140 contact the inner walls of the opening 124 and cannot be further advanced through the opening.

As noted, each of the coupling elements 110 and 120 also includes a socket (e.g., the socket 118 of the coupling element 110, and the socket 128 of the coupling element 120), which, in some implementations, may be a hollow tube or cylinder with an open end. In such implementations, the hollow tube of each of the coupling elements may extend from the second surface of the plates (e.g., the surface 125 of the plate 122 of the second coupling element 120), and may be configured to receive a rotatable member of a rotary sensor through the open end of the hollow tube. The rotatable member (e.g., a rotatable shaft) to be received by each of the hollow tubes may be secured to the hollow tube through tension forces of the inner walls of the hollow tubes acting on the outer surface of the portion the rotatable members received in the hollow tubes (i.e., press fitting the rotatable member into the socket), and/or by using some other fastening mechanism (e.g., threading the rotatable members into the hollow tubes, using latches, or other locking mechanisms, that lock into slots within the inner walls of the hollow tubes, etc.) to secure the rotatable members received in the hollow tubes. In some embodiments, a shaft of each sensor coupled through the coupler may also be secured to the coupler by welding or gluing the shaft into the coupler's sockets. The coupler may also be implemented so that it includes a solid shaft, instead of a tube, extending from the coupler, with such a solid shaft being received by an appropriate receiving mechanism (e.g., a socket) included with the rotatable member(s) the coupler is coupled to. In some embodiments, the sockets (e.g., hollow tubes) are integrally connected to the plates so that the plates and sockets constitute a single piece structure machined from, for example, bar stock such as 17-7PH or 15-5PH materials. In some embodiments, the leaf spring, disc section and socket form an integral one-piece disc-tube assembly that can be fashioned from a material (e.g., a solid-disc-shaped material) by performing a machine mill cut, a water jet cut, an Electrical Discharge Machining (EDM), etc. In some embodiments, the sockets may be separately constructed and subsequently secured to the plates of the coupling elements.

It should be noted that the couplers described herein are configured for redundancy, so that if, for example, the leaf spring of one coupler for any reason becomes loose or damaged, the second leaf spring will still enable secure engagement of the coupling elements of the coupler. Likewise, a coupler's pins also enable structural redundancy of the coupler.

In operation, the two coupling elements 110 and 120 are matingly engaged by fitting the projection 116 in the opening 124, and the projection 126 in the opening 114. A rotatable member of a first rotary sensor (or some other device with a rotatable member) is received in the socket (e.g., a hollow tube) 118 of the first coupling element 110, and a rotatable member of a second rotary sensor (or some other device with a rotatable member) is received in the socket 128 of the second coupling element 120.

Figures 2A, 2B:
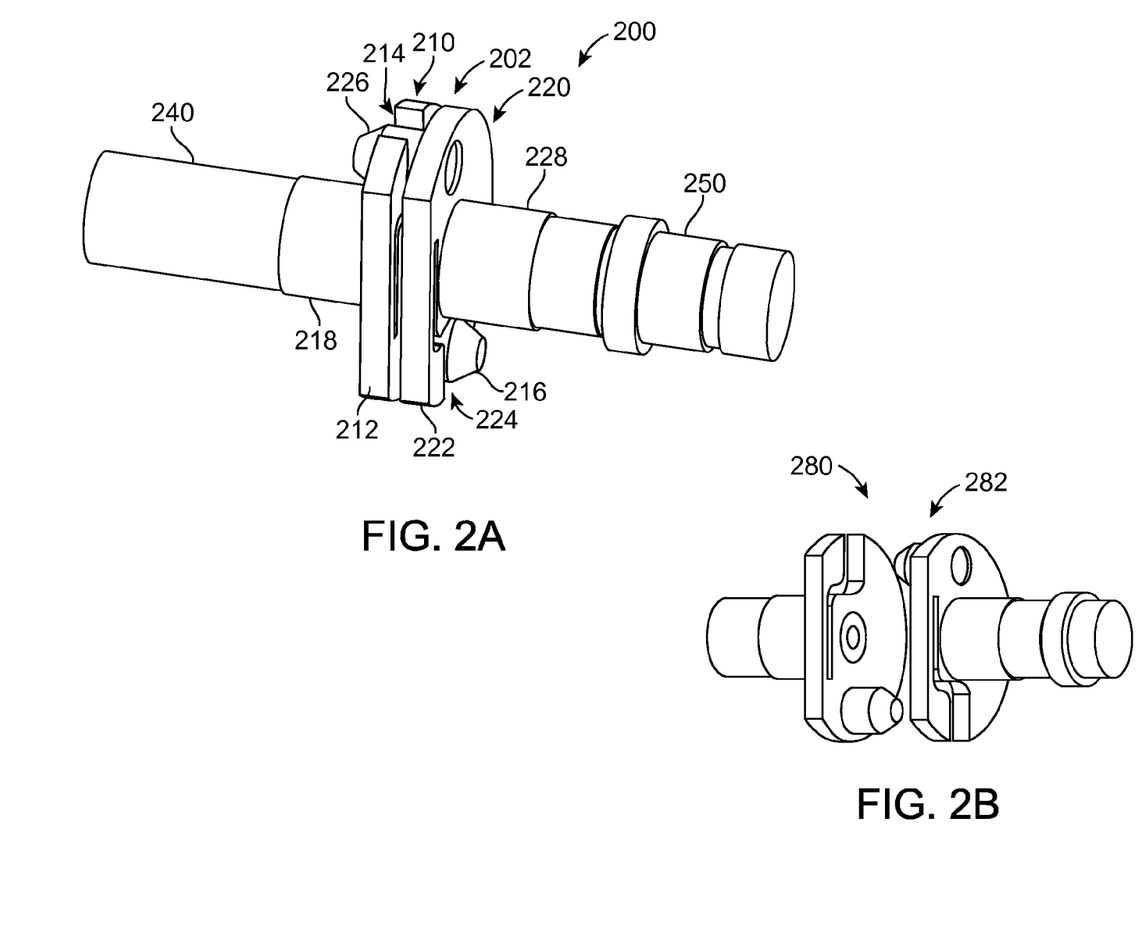
FIG. 2A is a perspective diagram of an assembly which includes a coupler coupled to two rotatable member of two devices.
FIG. 2B is a perspective diagram of a disengaged coupler with two coupling elements that are each coupled to a rotatable member.

More particularly, and with reference to FIG. 2A, a perspective diagram of an assembly 200, which includes a coupler 202 coupled to two rotatable members 240 and 250, is shown. FIG. 2B is another perspective diagram of another example embodiment of an assembly 280 in which a disengaged coupler 282 (i.e., its two coupling elements are not coupled to each other) is shown. The coupler 202 of FIG. 2A and the coupler 282 of FIG. 2B may be similar to the coupler 100 shown in FIGS. 1A-C. The coupler 202 of FIG. 2A may thus include a first and second coupling elements 210 and 220. The first coupling element 210 may include a plate 212 defining an opening 214, and a projection 216 (e.g., a pin secured to the plate 212 via, for example, a bore defined in the plate 212) extending from a first surface of the plate. The plate may include a disc section and a leaf spring extending from it, and may be similar to the disc sections and leaf springs depicted and described in relation to FIGS. 1A-C. The second coupling element likewise includes a plate 222 defining an opening 224, and a projection 226. To matingly engage the coupling elements to implement the coupler 202, the projection 216 of the first coupling element 210 is received in the opening 224 of the second coupling element 220, and the projection 226 of the coupling element 220 is received in the opening 214 of the first coupling element 210.

The rotatable member 240, which in the example embodiment of FIG. 2A is a rotatable shaft, may be used in an implementation of a first rotary sensor (not shown), whereas the rotatable member 250 (also a shaft in the embodiment of FIG. 2A) may be used in an implementation of a second rotary sensor (also not shown). In some embodiments, the rotary sensors used may be rotary variable differential transformer (RVDT) such as the sensors of the sensor assembly depicted in FIGS. 3A and B. Particularly, in the perspective diagram of FIGS. 3A and 3B, an example RVDT-based assembly 300 includes a first RVDT sensor 310 with a rotatable member, such as a rotatable shaft 312, and a second sensor 320 with a rotatable member, such as a rotatable shaft 322. The implementations depicted by FIG. 3A also include a third RVDT sensor 350, which is more particularly shown in FIG. 3B. The third RVDT sensor 350 includes a rotatable shaft 352 which is coupleable to an external rotatable member (i.e., external to the RVDT assembly 300) whose angular position is to be determined by the RVDT sensors of the assembly 300.

Figure 3A:
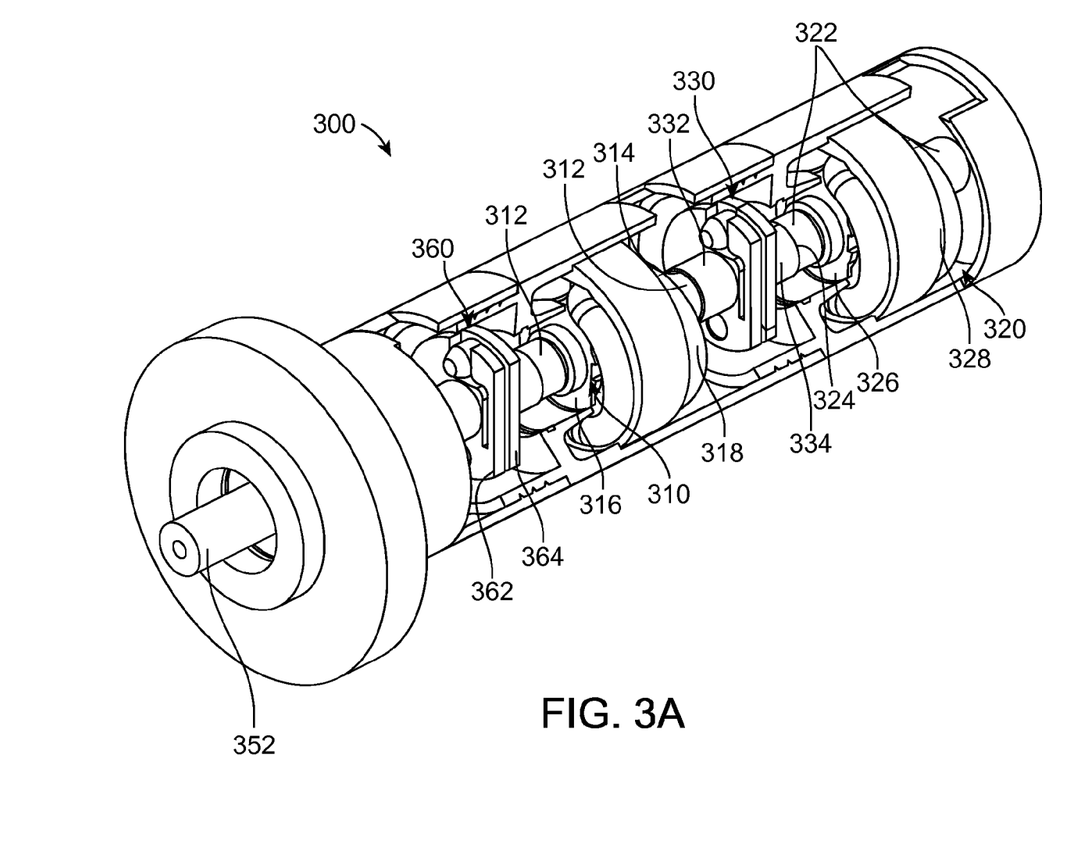
FIGS. 3A-B are perspective diagrams of an example RVDT sensor assembly that includes multiple rotary sensors that may be coupled to each other using the couplers and assemblies of FIGS. 1A-C and 2A-B.
Figure 3B:
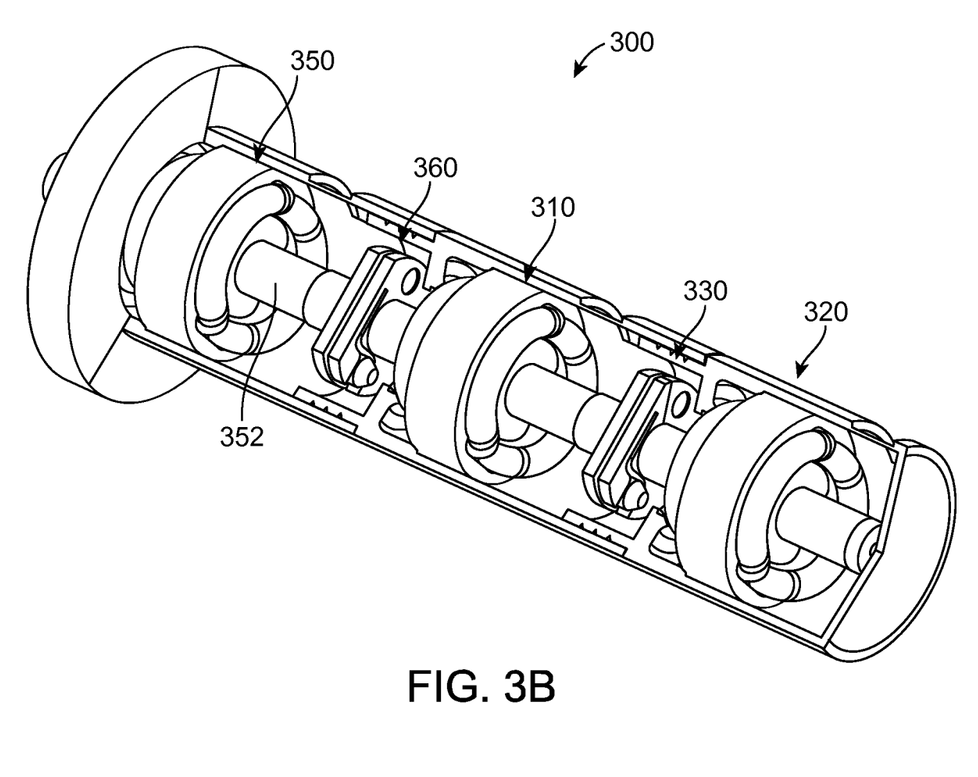

As shown in FIG. 3A, the two RVDT sensors 310 and 320 are coupled via an anti-backlash coupler 330 by fitting the end 314 of the rotatable shaft 312 into a first socket 332 of the coupler 330, and fitting an end 324 of the second RVDT sensor 320 into a second socket 334 of the coupler 330. The coupler 330 may have a structure/configuration similar to the coupler 100 shown in FIGS. 1A-C and/or the coupler 202 shown in FIGS. 2A-B. The RVDT sensor 350 may be coupled to the RVDT sensor 310 via an anti-backlash coupler 360, e.g., fitting an end of the rotatable shaft 352 into one socket on a plate of a first coupling element 362 of the coupler 360, and fitting another end of the shaft 312 into another socket on a plate of a second coupling element 364 of the coupler 360. The coupler 360 may also have a structure/configuration similar to the coupler 100 shown in FIGS. 1A-C and/or the coupler 202 shown in FIGS. 2A-B.

As further shown in FIG. 3A, the RVDT sensors 310 and 320 each includes a primary winding set (326, and 328) positioned proximate (e.g., surrounding) the respective rotatable shafts 312 and 322. Each of the RVDT sensors 310 and 320 further includes a secondary windings (also referred to as output windings) 318 and 328, respectively, positioned proximate the respective rotatable shafts 312 and 322 of the sensors. Disposed on the outer surface of each of the rotatable shafts 312 and 322 is at least one armature (not shown in FIG. 3A or 3B) that rotates with rotation of the rotatable shafts 312 and 322. The armature disposed on each of the rotatable members may be constructed from a solid magnetic material and may be welded or bonded to the rotatable members, or may be secured to the respective members in some other suitable way. When voltage (e.g., AC voltage) is applied to the primary winding sets 316 and 326, resultant voltages will be induced/produced at the respective secondary winding sets 318 and 328 set. Because the armatures secured to the rotatable members change the inductance of the windings as the armatures rotate, the voltage levels at the secondary windings will vary and be based, at least in part, on the positions of the armatures. Based on the resultant voltages at the secondary windings, the angular positions of the armatures disposed on the rotatable shafts of the RVDT sensors, and therefore the angular position of a rotatable external structure causing rotation of the rotatable shafts (e.g., via an interfacing device and/or via a rotatable shaft of another RVDT sensor in the assembly, such as the shaft 352 coupled to the RVDT sensor 350) can be determined. Determination (computation) of the angular position of an external rotatable structure based on measured resultant voltages of the secondary windings may be facilitated by a processor-based computing system that receives the resultant voltages (measured, for example, by voltage sensors or meters) and outputs a value indicative of a determined/computed angular position of the external rotatable structure.

In some implementations, RVDT sensors such as those described, for example, in International Patent Application No. PCT/US2012/22986, entitled "ROTARY VARIABLE DIFFERENTIAL TRANSFORMER (RVDT) SENSOR ASSEMBLY WITH AUXILIARY OUTPUT SIGNAL," the content of which is hereby incorporated by reference in its entirety, may be used in conjunction with the sensor assembly 300. In some implementations, other types of rotary sensors, including, for example, potentiometers, resolvers, etc., may be used in addition to, or instead of, RVDT-based sensors Turning back to FIG. 2A, the rotatable member of 240 of a first rotary sensor is received in a socket 218, such as a hollow tube or cylinder that is opened in at least one of its ends, and the rotatable member 250 of a second rotary sensor is received in a socket 228. The sockets 218 and 228 may be similar to the sockets 118 and 128 shown in FIG. 1A-C. Thus, the coupler 202 is supported (e.g., held) by the rotatable members 240 and 250 received into the coupler's sockets 218 and 228, respectively. Accordingly, rotation of a first rotatable member, such as the rotatable member 240, e.g., in response to rotation of an external rotatable structure, will cause the coupler to rotate to the same extent (i.e., by the same angular displacement) as that of the first rotatable member. The second rotatable member, for example, the member 250, which is coupled to the coupler 202 via the socket 228, will also rotate through the same angular displacement of the coupler, and, thus of the first rotatable member. Therefore, the rotary sensors corresponding to the rotatable members 240 and 250 will measure substantially the same angular displacement or position.

Because the two rotatable members 240 and 250 depicted in FIG. 2A are not directly connected to each other, the two sensors, therefore, do not need to be properly aligned with each other. Put another way, the use of a coupler similar to that shown and described in relation to FIGS. 1A-C and 2A-B effectively compensates for any misalignment between the sensors used. The couplers described herein thus implement blind assemblies in that it is not necessary to carefully align the sensors with respect to each other. Furthermore, because the two sensors are not directly mechanically connected to each other, backlash problems that generally result from mechanically connecting moving devices are avoided. Thus, such couplers operate as anti-backlash couplers. Additionally, the use of couplers such as those depicted in the implementations of FIG. 2A avoids having to directly couple two or more sensors, e.g., by directly coupling the sensors' shafts, thus avoiding having to make a long-lasting attachments (which may be permanent or semi-permanent) of the two or more sensors. Because the two or more sensors do not have to be directly attached to each other, the two or more sensors can therefore also be disengaged from each other without causing any permanent damage to any of the sensor's bearings.

Figure 4A:
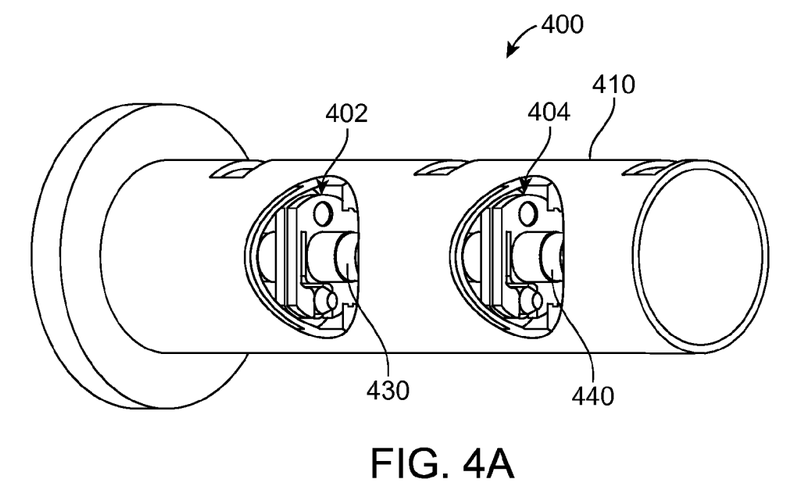
FIGS. 4A and 4B are diagrams of an example embodiment of an assembly including two couplers and at least three rotary sensors.
Figure 4B:
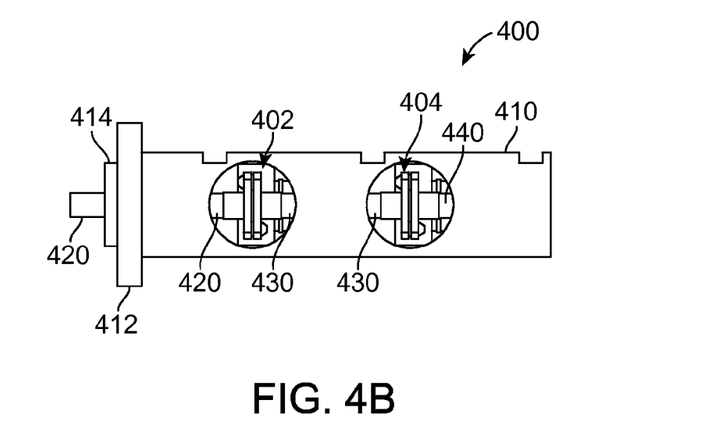

In some implementations (and as was also depicted in FIGS. 3A-B), multiple couplers, each of which may be similar to the couplers 100 and/or 202 described herein, may be used to couple a plurality of rotary sensors (e.g., in a series arrangement) to enable, for example, three or more independent measures of the angular position of a structure. Thus, with reference to FIGS. 4A and 4B, diagrams of an example embodiment of an assembly 400, which includes two couplers 402 and 404 and at least three rotary sensors, are shown. The couplers 402 and 404 and the rotary sensors coupled to them are housed within a hollow tube-shaped housing 410. The coupler 402 is connected, through the socket of its first coupling element, to the rotatable member 420 of a first rotary sensor, and is connected, through a socket of its second coupling element to a rotatable member 430 of a second rotary sensor. Another end of the rotatable member of the second rotary sensor is received in the socket of a first coupling element of the second coupler 404. The second coupling element of the second coupler 404 receives a rotatable member 440 of a third rotary sensor. Additional rotary sensors may be added to an assembly such as that depicted in FIGS. 4A and 4B, if required, using additional couplers, such as the couplers depicted and described in FIGS. 1A-C and 2A-B. As further shown in FIGS. 4A and B, in some implementations, the assembly 400 also includes a flange 412, coupled to the housing 410, that is configured to secure the housing 410, and the couplers and sensors disposed therein, to, for example, an interfacing device that connects to the external rotatable structure whose angular position is to be determined.

Thus, in some embodiments, an assembly is provided that includes two or more couplers that each comprises a first coupling element matingly engaged to a second coupling element. Each of the first and second coupling elements includes a plate defining an opening, a projection extending from a first surface of the plate, and a socket extending from a second surface of the plate and configured to receive a rotatable member. The assembly further includes a first rotatable device comprising a first rotatable shaft that is received in the socket of the first coupling element of one of the two or more couplers. Also included is a second rotatable device comprising a second rotatable shaft with a first end received in the socket of the second coupling element of the one of the two or more couplers and with a second end received in the socket of the first coupling element of another of the two or more couplers. An additional rotatable device comprising an additional rotatable shaft is received in the socket of the second coupling element of the other of the two or more couplers. Rotation of the first shaft of the first rotatable device will cause rotation of the two or more couplers and of the second shaft of the second rotatable device and of the additional shaft of the additional rotatable device.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A coupler comprising:
   a first coupling element matingly engaged to a second coupling element, both the first coupling element and the second coupling element each comprises:
      a plate with an opening extending from a first surface of the plate to a second surface of the plate,
      a projection extending from the first surface of the plate, and
      a socket extending from the second surface of the plate and configured to receive a rotatable member;
   wherein the projection of the first coupling element is received in the opening in the plate of the second coupling element, and the projection of the second coupling element is received in the opening in the plate of the first coupling element;
   and wherein the matingly engaged coupling elements are configured to rotate in response to rotation of a first rotatable member of a first device received in the socket of the first coupling element.

2. The coupler of claim 1, wherein the plate of each of the first coupling element and the second coupling element comprises:
   a disc section; and a leaf spring extending from the disc section such that the leaf spring and the disc section define the opening.

3. The coupler of claim 2, wherein the leaf spring integrally extends from the disc section.

4. The coupler of claim 2, wherein the leaf spring of the first coupling element extends in a first direction substantially opposite a second direction at which the leaf spring of the second coupling element extends.

5. The coupler of claim 1, wherein the projection extending from the plate of each of the first coupling element and the second coupling element includes a pin.

6. The coupler of claim 1, wherein the socket of each of the first coupling element and the second coupling element comprises a hollow tube with an open end, the hollow tube extending from the second surface of the plate is configured to receive the rotatable member through the open end of the hollow tube.

7. The coupler of claim 1, wherein the first rotatable member of the first device is a shaft of a rotatory sensor.

8. The coupler of claim 7, wherein the rotary sensor includes one of: a rotary variable differential transformer (RVDT) sensor, a resolver sensor, and a potentiometer-based sensor.

9. The coupler of claim 1, wherein the coupler is configured to enable serial connection of multiple rotary sensors without causing backlash from the serial connection of the multiple sensors.

10. The coupler of claim 2, wherein the leaf spring of the first coupling element is structured to be resiliently biased inwardly and to define, with the disc section of the first coupling element, the opening with an opening diameter smaller than a projection diameter of the projection of the second coupling element, such that when the projection of the second coupling element is received within the opening defined by the disc section and leaf spring of the first coupling element, the resiliently structured leaf spring of the first coupling element is pushed outwardly and applies an inward force to keep the received projection from the second coupling element in the opening of the first coupling element.

11. The coupler of claim 1, wherein the second coupling element, matingly engaged to the first coupling element, is aligned as a mirror opposite of the first coupling element rotated by 180° relative to the first coupling element.

12. A coupler comprising:
a first coupling element comprising a first plate with a first opening extending from a first surface of the first plate to a second surface of the first plate, a first projection extending from the first surface of the first plate, and a first socket extending from the second surface of the first plate and configured to receive a rotatable member of a separate device, the first plate including a first disc section and a first leaf spring extending from the first disc section such that the first leaf spring and the first disc section define the first opening; and
a second coupling element matingly engaged to the first coupling element, the second coupling element comprising a second plate with a second opening extending from a first surface of the second plate to a second surface of the second plate, a second projection extending from the first surface of the second plate, and a second socket extending from the second surface of the second plate and configured to receive the rotatable member, the second plate including a second disc section and a second leaf spring extending from the second disc section such that the second leaf spring and the second disc section define the second opening;
wherein the first projection of the first coupling element is received in the second opening in the second plate of the second coupling element, and the second projection of the second coupling element is received in the first opening in the first plate of the first coupling element;
and wherein the matingly engaged first coupling element and the second coupling element are configured to rotate in response to rotation of the rotatable member received in the first socket of the first coupling element.

* * * * *